(12) United States Patent
Suoniemi

(10) Patent No.: US 6,601,487 B1
(45) Date of Patent: Aug. 5, 2003

(54) METHOD AND APPARATUS FOR GUIDING A SAW BLADE

(75) Inventor: Rauno Suoniemi, Mäntyharju (FI)

(73) Assignee: Veisto-Rakenne Rautio Oy, Mäntyharju (FI)

( * ) Notice: Subject to any disclaimer, the term of this patent is extended or adjusted under 35 U.S.C. 154(b) by 0 days.

(21) Appl. No.: 09/402,714

(22) PCT Filed: Apr. 7, 1998

(86) PCT No.: PCT/FI98/00301

§ 371 (c)(1),
(2), (4) Date: Oct. 8, 1999

(87) PCT Pub. No.: WO98/45098

PCT Pub. Date: Oct. 15, 1998

(30) Foreign Application Priority Data

Apr. 9, 1997 (FI) .................................................. 971476

(51) Int. Cl.⁷ ................................................ B26D 3/00
(52) U.S. Cl. ................................ 83/13; 83/821; 83/824
(58) Field of Search ........................... 83/13, 821, 820, 83/824

(56) References Cited

U.S. PATENT DOCUMENTS

| | | | | |
|---|---|---|---|---|
| 3,574,257 A | * | 4/1971 | Du Bois ...................... | 83/170 |
| 3,674,065 A | * | 7/1972 | Fairfield, Jr. et al. ........... | 83/13 |
| 4,023,866 A | * | 5/1977 | Gutierrez Atencio ........ | 308/77 |
| 4,091,580 A | * | 5/1978 | Oates .......................... | 83/171 |
| 4,136,590 A | * | 1/1979 | Kordyban et al. ............ | 83/821 |
| 4,164,883 A | * | 8/1979 | Jagers ......................... | 83/821 |
| 4,262,567 A | * | 4/1981 | Bettin ......................... | 83/171 |
| 4,391,168 A | * | 7/1983 | Gerber et al. ................. | 83/13 |
| 4,635,513 A | * | 1/1987 | McGeehee ................... | 83/821 |
| 5,235,879 A | * | 8/1993 | Drougge ....................... | 83/13 |
| 6,021,772 A | * | 2/2000 | Seifert et al. ............ | 125/13.02 |

* cited by examiner

*Primary Examiner*—Kenneth E. Peterson
*Assistant Examiner*—Amar Flores-Sánchez
(74) *Attorney, Agent, or Firm*—Kubovcik & Kubovcik

(57) ABSTRACT

Method for guiding a saw blade (1), in which method at least one guide stop (2) at least on one side of the blade is used to guide the blade. A layer of an intermediate agent (3) in a substantially solid state, such as a layer of ice, is formed on that surface of the guide stop (2) which faces the blade (1).

12 Claims, 1 Drawing Sheet

METHOD AND APPARATUS FOR GUIDING A SAW BLADE

The present invention relates to a method and to an apparatus for guiding a saw blade.

Saw blades such as circular saw blades or bandsaw blades are guided using so-called blade guides both in sawing machines with permanent settings and in sawing machines with variable settings. Solutions are known in which various metals and their mixtures are used as blade guides. A blade guide solution is presented in FI publication 67800. A drawback with prior-art solutions is that they need water or an emulsion of water and oil for lubrication. These are a source of problems especially when the temperature is below 0° C. In addition, there are emulsions which have detrimental effects e.g. on the environment or health. A significant drawback is also the need for adjustment and maintenance due to wear.

The object of the present invention is to create a completely new type of method and apparatus for guiding a saw blade.

The invention is characterised by what is presented in the claims.

The method of the invention has numerous significant advantages. By forming a layer of ice as a guide surface, a very low friction coefficient is achieved, which substantially reduces the power loss and helps maintain a low blade temperature. The need for adjustment is diminished. The need for wearing parts is eliminated. The amount of water or emulsion consumed is substantially smaller than with prior-art blade guides. In a solution according to the method of the invention, the blade is cooled, with the result that, when a circular saw blade is used, a correct kind of stress state is generated in the blade.

Figure 1:
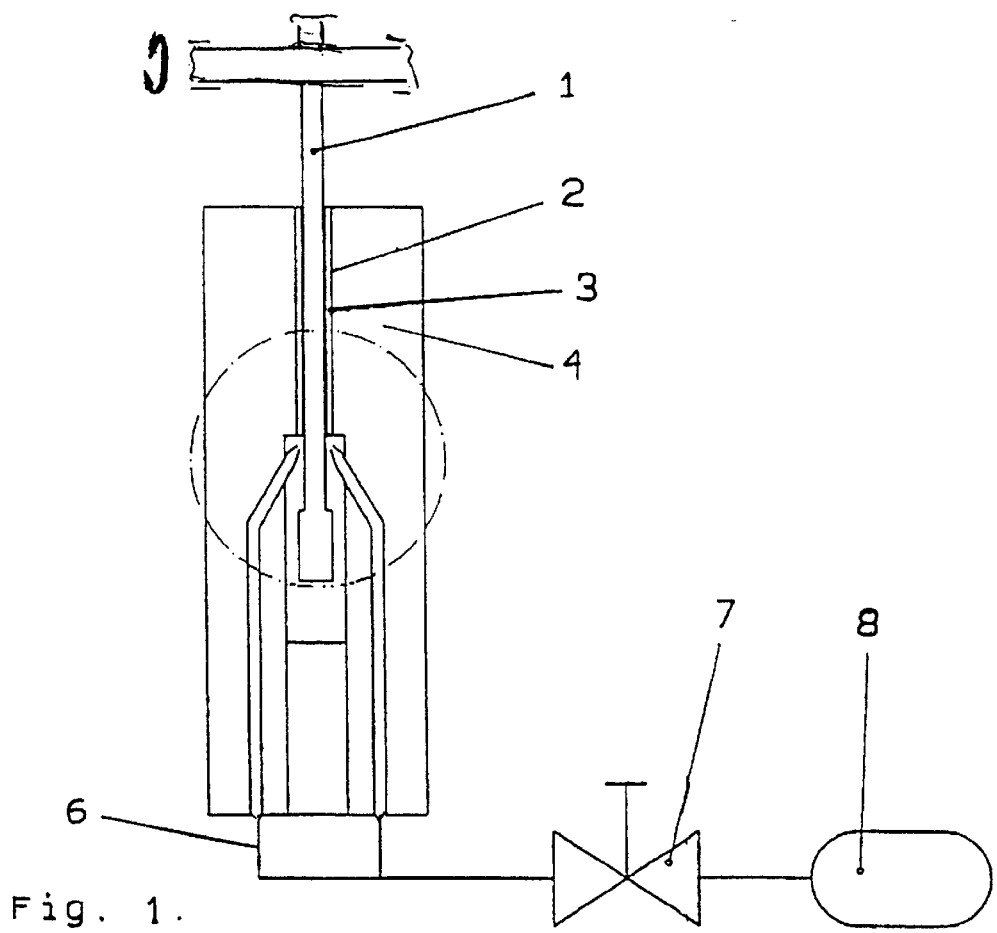
Figure 2:
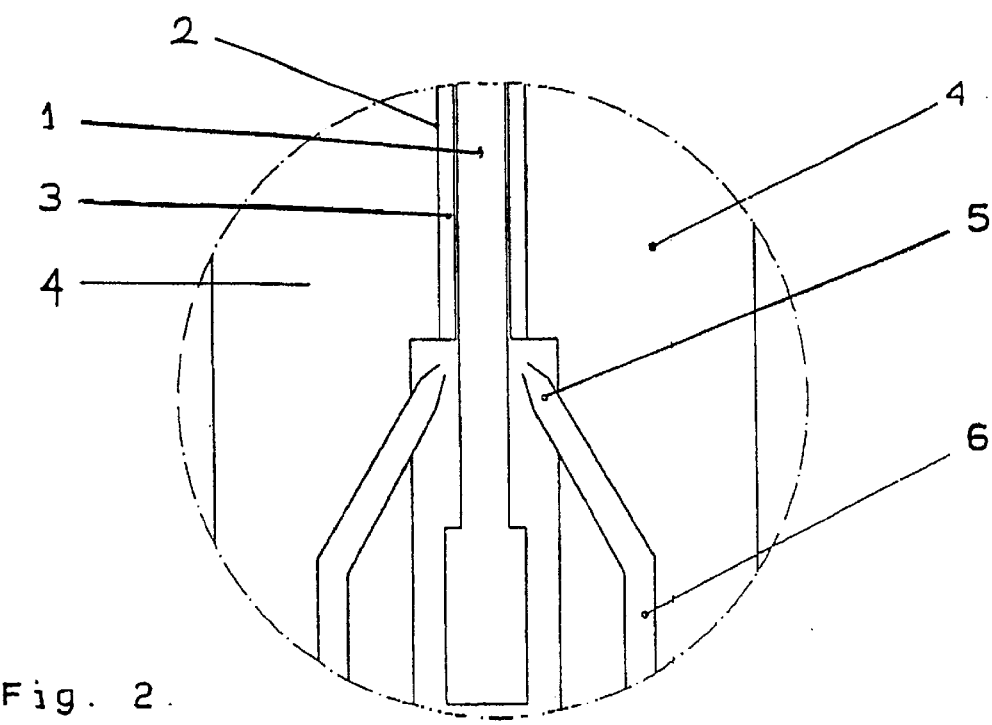

In the following, the invention will be described in detail by the aid of an example by referring to the attached drawings, in which FIG. 1 presents a simplified view of an apparatus applying the method of the invention, and FIG. 2 presents a detail of the blade guide.

Method for guiding a saw blade 1, in which method at least one guide stop 2 at least on one side of the blade is used to guide the blade. The figures show a part of a circular saw blade 1 disposed between two guide stops 2. A layer of intermediate agent 3 in a substantially solid state, such as a layer of ice, is created on the guide stop 2 surface facing the blade 1, said layer acting as a sliding surface between the blade 1 and the guide stop 2. This is a very advantageous solution because the friction coefficient of ice is e.g. only about 1/10 of the friction coefficient of iron. A sufficient layer of intermediate agent 3 is maintained during sawing and, if necessary, the thickness of the layer is adjusted.

The layer 3 of intermediate agent is created by cooling the blade guide body either directly and/or using a cooling medium. If necessary, water or some other substance capable of being frozen is applied onto the stop face. The cooling medium used is e.g. glycol or nitrogen, most suitably liquid nitrogen. The layer of intermediate agent can be formed from a liquid, gas or a mixture of these. Preferably the layer of intermediate agent is formed from water or from an emulsion which will freeze on the guide stop.

According to a preferred embodiment, liquid nitrogen and water are sprayed onto the stop face of the blade guide.

In an embodiment, the layer of intermediate agent 3, such as a layer of ice, has a thickness of 0.1–2 mm, preferably 0.3–1 mm. The thickness of the layer of intermediate agent is controlled via feedback.

Apparatus for guiding a saw blade, said apparatus comprising a guide body 4 provided with at least one stop face 2. Arranged in conjunction with the guide are means 5,6,7,8 for forming a layer of ice 3 on the stop face 2.

The cooling system comprises means for cooling the stop face from the outside. In a certain case, the apparatus comprises at least a nozzle 5 through which a cooling agent such as liquid nitrogen is sprayed onto the stop face 2 or at least to its vicinity.

The nitrogen is passed to the nozzle via pipe elements 6 e.g. from a pressure tank 8. The passage and dosage of cooling agent is adjusted by means of a regulating/closing element, e.g. a valve 7.

The apparatus may additionally comprise a regulating system, e.g. feedback, by means of which a desired thickness of the layer of ice is maintained. In this case, the apparatus is provided with e.g. a regulator for controlling the regulating/closing element 7, said regulator controlling the dosage of cooling agent on the basis of feedback data.

It is obvious to the person skilled in the art that the invention is not restricted to the embodiments described above, but that it may be varied within the scope of the claims. Thus, the method and apparatus can be used with many types of saw blade, including circular saw blades and bandsaw blades.

What is claimed is:

1. Method for guiding a saw blade (1) having a cutting surface, comprising disposing at least one guide stop (2) at least on one side of the blade in sliding contact with the blade at an area apart from the cutting surface to guide the blade, and forming, as a sliding surface between the blade (1) and the guide stop (2), a layer of intermediate agent (3) in a substantially solid state on a surface of the guide stop (2) which faces the blade (1) by cooling the surface of the guide stop (2) which faces the blade (1).

2. Method as defined in claim 1, characterised in that the intermediate agent is formed from water or other substance capable of freezing.

3. Method as defined in claim 1, characterised in that the thickness of the layer of intermediate agent (3) is regulated by controlling the dosage of a cooling medium sprayed onto the surface of the guide stop (2) which faces the blade (1) or the vicinity of said surface.

4. Method as defined in claim 1, characterised in that the cooling medium used is glycol or nitrogen.

5. Method as defined in claim 1, characterised in that the layer of intermediate agent (3) is ice.

6. Method as defined in claim 1, wherein the surface of the guide stop (2) which faces the blade (1) is cooled directly.

7. Method as defined in claim 1, wherein the surface of the guide stop (2) which faces the blade (1) is cooled using a cooling medium.

8. Method as defined in claim 1, wherein the surface of the guide stop (2) which faces the blade (1) is cooled directly and using a cooling medium.

9. Apparatus for guiding a saw blade (1) having a cutting surface, said apparatus comprising at least one guide body (4) provided with at least one stop face (2) disposed against the side of the blade (1) in sliding contact with the blade at an area apart from the cutting surface, characterised in in that means for creating, as a sliding surface between the saw blade (1) and guide body (4), a layer of intermediate agent (3) in a substantially solid state on the stop face (2) is provided in conjunction with the apparatus, said means comprising elements (5,6,8) for cooling the stop face (2) from a location external to guide body (4).

10. Apparatus as defined in claim 9, characterised in that the intermediate agent (3) is ice and the means for creating a layer of the intermediate agent (3) comprises elements for passing a cooling medium onto the stop face (2) or its vicinity.

11. Apparatus as defined in claim 9, characterised in that the layer of intermediate agent (3) is ice.

12. Apparatus as defined in claim 9, characterised in that the means for creating the layer of intermediate agent (3) comprises elements for spraying a cooling medium onto the stop face (2) or its vicinity.

* * * * *